United States Patent
Cope et al.

(10) Patent No.: US 7,132,819 B1
(45) Date of Patent: Nov. 7, 2006

(54) FLOATING POWER SUPPLY AND METHOD OF USING THE SAME

(75) Inventors: Leonard David Cope, Jefferson, MD (US); Robert Frank Rubock, Jefferson, MD (US)

(73) Assignee: Current Technologies, LLC, Germantown, MD (US)

(*) Notice: Subject to any disclaimer, the term of this patent is extended or adjusted under 35 U.S.C. 154(b) by 0 days.

(21) Appl. No.: 10/292,745

(22) Filed: Nov. 12, 2002

(51) Int. Cl.
*G05F 1/40* (2006.01)
*H04M 11/04* (2006.01)

(52) U.S. Cl. .................................................. 323/282

(58) Field of Classification Search ............... 323/234, 323/268, 271, 282, 285, 293; 340/310.01, 340/310.02, 310.07, 310.08, 332, 333, 310.11, 340/310.12, 310.17, 310.18
See application file for complete search history.

(56) References Cited

U.S. PATENT DOCUMENTS

| | | |
|---|---|---|
| 1,547,242 A | 7/1925 | Strieby |
| 2,298,435 A | 10/1942 | Tunick .......................... 250/15 |
| 2,577,731 A | 12/1951 | Berger ......................... 179/2.5 |
| 3,369,078 A | 2/1968 | Stradley ...................... 179/2.5 |
| 3,445,814 A | 5/1969 | Spalti ........................... 340/151 |
| 3,605,009 A | 9/1971 | Enge ............................. 323/93 |
| 3,641,536 A | 2/1972 | Prosprich ............... 340/870.15 |
| 3,656,112 A | 4/1972 | Paull ........................... 340/151 |
| 3,696,383 A | 10/1972 | Oishi et al. ................. 340/310 |
| 3,701,057 A | 10/1972 | Hoer .......................... 333/112 |
| 3,702,460 A | 11/1972 | Blose ........................ 340/150 |
| 3,810,096 A | 5/1974 | Kabat et al. ............ 340/147 R |
| 3,846,638 A | 11/1974 | Wetherell ...................... 307/3 |
| 3,895,370 A | 7/1975 | Valentini .................... 340/310 |
| 3,900,842 A | 8/1975 | Calabro et al. ........ 340/310.03 |
| 3,911,415 A | 10/1975 | Whyte ........................ 340/310 |
| 3,942,168 A | 3/1976 | Whyte ................... 340/310.01 |
| 3,942,170 A | 3/1976 | Whyte ........................ 340/310 |

(Continued)

FOREIGN PATENT DOCUMENTS

DE      197 28 270 A1    1/1999

(Continued)

OTHER PUBLICATIONS

Liu, E. et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31-Apr. 2, 2004] 6 pages.

(Continued)

*Primary Examiner*—Matthew V. Nguyen
(74) *Attorney, Agent, or Firm*—Mel Barnes; Capital Legal Group, LLC (57) ABSTRACT

A power supply of the present invention comprises a transducer having a transducer and a voltage regulator. The transducer is coupled to an electrically non-conductive medium, which may be a light pipe. The electrically non-conductive medium is coupled to a non-electrical energy source such as a light source and the non-electrical energy source communicates energy to the transducer via said electrically non-conductive medium. The transducer converts the received light energy to electrical energy, which is supplied to a voltage regulator. The voltage regulator has a regulator ground, regulator output, and regulator input. The regulator input is electrically coupled to the transducer output and the regulator ground is electrically coupled to a live conductor of a medium voltage power line. The regulator output therefore provides an output voltage that is ground referenced to the live conductor of the medium voltage power line.

38 Claims, 4 Drawing Sheets

U.S. PATENT DOCUMENTS

| | | | |
|---|---|---|---|
| 3,962,547 A | 6/1976 | Pattantyus-Abraham | 179/2.5 R |
| 3,964,048 A | 6/1976 | Lusk et al. | 340/310 R |
| 3,967,264 A | 6/1976 | Whyte et al. | 340/310.08 |
| 3,973,087 A | 8/1976 | Fong | 179/170 R |
| 3,973,240 A | 8/1976 | Fong | 340/151 |
| 4,004,110 A | 1/1977 | Whyte | 179/170 J |
| 4,004,257 A | 1/1977 | Geissler | 333/207 |
| 4,012,733 A | 3/1977 | Whyte | 340/310 |
| 4,016,429 A | 4/1977 | Vercellotti et al. | 307/149 |
| 4,017,845 A | 4/1977 | Kilian et al. | 340/310.02 |
| 4,053,876 A | 10/1977 | Taylor | 340/529 |
| 4,057,793 A | 11/1977 | Johnson et al. | 340/310 R |
| 4,060,735 A | 11/1977 | Pascucci et al. | 307/3 |
| 4,070,572 A | 1/1978 | Summerhayes | 250/199 |
| 4,119,948 A | 10/1978 | Ward et al. | 340/870.02 |
| 4,142,178 A | 2/1979 | Whyte et al. | 340/310 |
| 4,188,619 A | 2/1980 | Perkins | 340/310 R |
| 4,239,940 A | 12/1980 | Dorfman | 179/2.51 |
| 4,250,489 A | 2/1981 | Dudash et al. | 340/147 T |
| 4,254,402 A | 3/1981 | Perkins | 340/310 R |
| 4,263,549 A | 4/1981 | Toppeto | 324/127 |
| 4,268,818 A | 5/1981 | Davis et al. | 340/870.38 |
| 4,298,835 A * | 11/1981 | Rowe | 323/281 |
| 4,323,882 A | 4/1982 | Gajjar | 340/310 R |
| 4,357,598 A | 11/1982 | Melvin, Jr. | 340/310 A |
| 4,359,644 A | 11/1982 | Foord | 307/40 |
| 4,367,522 A | 1/1983 | Forstbauer et al. | 363/137 |
| 4,383,243 A | 5/1983 | Krügel et al. | 340/310 R |
| 4,386,436 A | 5/1983 | Kocher et al. | 455/151.4 |
| 4,408,186 A | 10/1983 | Howell | 340/310 A |
| 4,409,542 A | 10/1983 | Becker et al. | 324/57 Q |
| 4,413,250 A | 11/1983 | Porter et al. | 340/310.01 |
| 4,419,621 A | 12/1983 | Becker et al. | 324/51 |
| 4,433,284 A | 2/1984 | Perkins | 323/211 |
| 4,442,492 A | 4/1984 | Karlsson et al. | 364/464 |
| 4,457,014 A | 6/1984 | Bloy | 381/98 |
| 4,468,792 A | 8/1984 | Baker et al. | 375/45 |
| 4,471,399 A | 9/1984 | Udren | 361/64 |
| 4,473,816 A | 9/1984 | Perkins | 340/310 |
| 4,473,817 A | 9/1984 | Perkins | 340/310 |
| 4,475,209 A | 10/1984 | Udren | 375/4 |
| 4,479,033 A | 10/1984 | Brown et al. | 179/2.51 |
| 4,481,501 A | 11/1984 | Perkins | 340/310 |
| 4,495,386 A | 1/1985 | Brown et al. | 455/402 |
| 4,504,705 A | 3/1985 | Pilloud | 381/77 |
| 4,517,548 A | 5/1985 | Ise et al. | 340/310 R |
| 4,569,045 A | 2/1986 | Schieble et al. | 370/85 |
| 4,599,598 A | 7/1986 | Komoda et al. | 340/310 A |
| 4,636,771 A | 1/1987 | Ochs | 340/310.05 |
| 4,642,607 A | 2/1987 | Strom et al. | 340/310 |
| 4,644,321 A | 2/1987 | Kennon | 340/310 A |
| 4,652,855 A | 3/1987 | Weikel | 340/310 |
| 4,668,934 A | 5/1987 | Shuey | 340/310.06 |
| 4,675,648 A | 6/1987 | Roth et al. | 340/310.07 |
| 4,683,450 A | 7/1987 | Max et al. | 333/202 |
| 4,686,382 A | 8/1987 | Shuey | 307/149 |
| 4,686,641 A | 8/1987 | Evans | 364/580 |
| 4,697,166 A | 9/1987 | Warnagiris et al. | 340/310 R |
| 4,701,945 A | 10/1987 | Pedigo | 379/66 |
| 4,724,381 A | 2/1988 | Crimmins | 324/127 |
| 4,745,391 A | 5/1988 | Gajjar | 340/310 A |
| 4,746,897 A | 5/1988 | Shuey | 340/310 R |
| 4,749,992 A | 6/1988 | Fitzemeyer et al. | 340/870.02 |
| 4,766,414 A | 8/1988 | Shuey | 340/310 A |
| 4,772,870 A | 9/1988 | Reyes | 340/310 R |
| 4,785,195 A | 11/1988 | Rochelle et al. | 307/18 |
| 4,800,363 A | 1/1989 | Braun et al. | 340/310 A |
| 4,815,106 A | 3/1989 | Propp et al. | 375/257 |
| 4,835,517 A | 5/1989 | van der Gracht et al. | 340/310 A |
| 4,890,089 A | 12/1989 | Shuey | 340/310.07 |
| 4,903,006 A | 2/1990 | Boomgaard | 340/310 A |
| 4,904,996 A | 2/1990 | Fernandes | 340/870.07 |
| 4,912,553 A | 3/1990 | Pal et al. | 358/86 |
| 4,962,496 A | 10/1990 | Vercellotti et al. | 370/204 |
| 4,973,940 A | 11/1990 | Sakai et al. | 340/310 R |
| 4,979,183 A | 12/1990 | Cowart | 375/142 |
| 5,006,846 A | 4/1991 | Granville et al. | 340/870.28 |
| 5,066,939 A | 11/1991 | Mansfield, Jr. | 340/310 R |
| 5,068,890 A | 11/1991 | Nilssen | 379/90 |
| 5,132,992 A | 7/1992 | Yurt et al. | 375/240 |
| 5,148,144 A | 9/1992 | Sutterlin et al. | 340/310 A |
| 5,151,838 A | 9/1992 | Dockery | 340/310 R |
| 5,185,591 A | 2/1993 | Shuey | 340/310 A |
| 5,191,467 A | 3/1993 | Kapany et al. | 359/341 |
| 5,210,519 A | 5/1993 | Moore | 340/310 |
| 5,257,006 A | 10/1993 | Graham et al. | 340/310 A |
| 5,264,823 A | 11/1993 | Stevens | 340/310.04 |
| 5,272,462 A | 12/1993 | Teyssandier et al. | 340/310.01 |
| 5,301,208 A | 4/1994 | Rhodes | 375/36 |
| 5,319,634 A | 6/1994 | Bartholomew et al. | 370/18 |
| 5,341,265 A | 8/1994 | Westrom et al. | 361/44 |
| 5,351,272 A | 9/1994 | Abraham | 375/38 |
| 5,355,109 A | 10/1994 | Yamazaki | 336/92 |
| 5,359,625 A | 10/1994 | Vander Mey et al. | 375/1 |
| 5,369,356 A | 11/1994 | Kinney et al. | 324/142 |
| 5,375,141 A | 12/1994 | Takahashi | 375/1 |
| 5,406,249 A | 4/1995 | Pettus | 340/310.06 |
| 5,410,720 A | 4/1995 | Osterman | 725/150 |
| 5,426,360 A | 6/1995 | Maraio et al. | 324/126 |
| 5,432,841 A | 7/1995 | Rimer | 455/457 |
| 5,448,229 A | 9/1995 | Lee, Jr. | 340/870.02 |
| 5,461,629 A | 10/1995 | Sutterlin et al. | 371/30 |
| 5,477,091 A | 12/1995 | Fiorina et al. | 307/66 |
| 5,481,249 A | 1/1996 | Sato | 340/2.1 |
| 5,485,040 A | 1/1996 | Sutterlin | 307/3 |
| 5,497,142 A | 3/1996 | Chaffanjon | 340/310.06 |
| 5,498,956 A | 3/1996 | Kinney et al. | 324/142 |
| 4,749,992 A | 6/1996 | Fitzmeyer et al. | 340/870.02 |
| 5,533,054 A | 7/1996 | DeAndrea et al. | 375/286 |
| 5,537,087 A | 7/1996 | Naito | 336/92 |
| 5,559,377 A | 9/1996 | Abraham | 307/104 |
| 5,568,185 A | 10/1996 | Yoshikazu | 348/22 |
| 5,575,860 A * | 11/1996 | Cherney | 136/245 |
| 5,579,221 A | 11/1996 | Mun | 364/188 |
| 5,579,335 A | 11/1996 | Sutterlin et al. | 375/200 |
| 5,592,482 A | 1/1997 | Abraham | 348/8 |
| 5,598,406 A | 1/1997 | Albrecht et al. | 370/296 |
| 5,616,969 A | 4/1997 | Morava | 307/91 |
| 5,625,863 A | 4/1997 | Abraham | 455/3.3 |
| 5,630,204 A | 5/1997 | Hylton et al. | 455/3.3 |
| 5,640,416 A | 6/1997 | Chalmers | 375/147 |
| 5,648,897 A * | 7/1997 | Johnson et al. | 700/83 |
| 5,664,002 A | 9/1997 | Skinner, Sr. | 379/56.2 |
| 5,684,450 A | 11/1997 | Brown | 340/310.02 |
| 5,691,691 A | 11/1997 | Merwin et al. | 340/310.02 |
| 5,694,108 A | 12/1997 | Shuey | 340/310.01 |
| 5,705,974 A | 1/1998 | Patel et al. | 340/310.08 |
| 5,712,614 A | 1/1998 | Patel et al. | 340/310.03 |
| 5,717,685 A | 2/1998 | Abraham | 370/30 |
| 5,726,980 A | 3/1998 | Rickard | 370/293 |
| 5,748,104 A | 5/1998 | Argyroudis et al. | 340/870.11 |
| 5,748,671 A | 5/1998 | Sutterlin et al. | 375/206 |
| 5,751,803 A | 5/1998 | Shpater | 379/379 |
| 5,770,996 A | 6/1998 | Severson et al. | 340/310.08 |
| 5,774,526 A | 6/1998 | Propp et al. | 379/90.1 |
| 5,777,544 A | 7/1998 | Vander Mey et al. | 340/310.06 |
| 5,777,545 A | 7/1998 | Patel et al. | 341/310.06 |
| 5,777,769 A | 7/1998 | Coutinho | 359/173 |
| 5,778,116 A | 7/1998 | Tomich | 385/16 |
| 5,796,607 A | 8/1998 | Le Van Suu | 364/140.01 |
| 5,798,913 A | 8/1998 | Tiesinga et al. | 363/21.13 |
| 5,801,643 A | 9/1998 | Williams et al. | 340/870.02 |
| 5,802,102 A | 9/1998 | Davidovici | 375/152 |

| | | | | | | | |
|---|---|---|---|---|---|---|---|
| 5,805,053 | A | 9/1998 | Patel et al. ............. 340/310.01 | 6,449,318 | B1 | 9/2002 | Rumbaugh ................ 375/309 |
| 5,805,458 | A | 9/1998 | McNamara et al. .......... 702/60 | 6,452,482 | B1 | 9/2002 | Cern ................... 340/310.01 |
| 5,818,127 | A | 10/1998 | Abraham ................... 307/106 | 6,480,510 | B1 | 11/2002 | Binder .................. 370/502 |
| 5,828,293 | A | 10/1998 | Rickard ................. 340/310.04 | 6,486,747 | B1 | 11/2002 | DeCramer et al. ............ 333/25 |
| 5,835,005 | A | 11/1998 | Furukawa et al. ....... 340/310.01 | 6,492,897 | B1 | 12/2002 | Mowery, Jr. ........... 340/310.01 |
| 5,847,447 | A | 12/1998 | Rozin et al. ................. 257/678 | 6,496,104 | B1 | 12/2002 | Kline .................... 340/310.01 |
| 5,850,114 | A | 12/1998 | Froidevaux ................. 307/105 | 6,504,357 | B1 | 1/2003 | Hemminger et al. ... 340/310.01 |
| 5,856,776 | A | 1/1999 | Armstrong et al. .... 340/310.01 | 6,507,573 | B1 | 1/2003 | Brandt et al. ................ 370/335 |
| 5,864,284 | A | 1/1999 | Sanderson et al. ..... 340/310.01 | 6,515,485 | B1 | 2/2003 | Bullock et al. ............. 324/601 |
| 5,870,016 | A | 2/1999 | Shrestha ................. 340/310.01 | 6,522,626 | B1 | 2/2003 | Greenwood ................ 370/208 |
| 5,880,677 | A | 3/1999 | Lestician ................. 340/825.06 | 6,549,120 | B1 | 4/2003 | de Buda ................ 340/310.01 |
| 5,881,098 | A | 3/1999 | Tzou .......................... 375/152 | 6,577,231 | B1 | 6/2003 | Litwin, Jr. et al. ....... 340/310.01 |
| 5,892,430 | A | 4/1999 | Wiesman et al. ....... 340/310.01 | 6,590,493 | B1 | 7/2003 | Rasimas ................ 340/310.01 |
| 5,892,758 | A | 4/1999 | Argyroudis ................ 370/335 | 6,611,134 | B1 | 8/2003 | Chung .......................... 324/74 |
| 5,929,750 | A | 7/1999 | Brown ................. 340/310.02 | 6,624,532 | B1 | 9/2003 | Davidow et al. ............. 307/39 |
| 5,933,071 | A | 8/1999 | Brown ................. 340/310.01 | 6,624,745 | B1 | 9/2003 | Willer ................... 340/310.01 |
| 5,933,073 | A | 8/1999 | Shuey ................... 340/310.07 | 6,646,447 | B1 | 11/2003 | Cern et al. ................... 324/539 |
| 5,937,003 | A | 8/1999 | Sutterlin et al. ............. 375/208 | 6,650,249 | B1 | 11/2003 | Meyer et al. .......... 340/870.02 |
| 5,937,342 | A | 8/1999 | Kline ......................... 455/402 | 6,667,685 | B1 | 12/2003 | Wasaki et al. ......... 340/310.03 |
| 5,949,327 | A | 9/1999 | Brown ................. 340/310.01 | 6,668,058 | B1 | 12/2003 | Grimes ...................... 379/322 |
| 5,952,914 | A | 9/1999 | Wynn .................... 340/310.01 | 6,683,531 | B1 | 1/2004 | Diamanti et al. ....... 340/310.01 |
| 5,963,585 | A | 10/1999 | Omura et al. ................. 375/207 | 6,686,832 | B1 | 2/2004 | Abraham ................ 340/310.01 |
| 5,977,650 | A | 11/1999 | Rickard et al. ................. 307/3 | 6,696,925 | B1 | 2/2004 | Aiello, Jr. ................ 340/310.01 |
| 5,978,371 | A | 11/1999 | Mason, Jr. et al. ......... 370/389 | 6,753,742 | B1 | 6/2004 | Kim et al. ................. 333/24 R |
| 5,982,276 | A | 11/1999 | Stewart ................. 340/310.01 | 6,785,532 | B1 | 8/2004 | Rickard ....................... 455/402 |
| 5,994,998 | A | 11/1999 | Fisher et al. ........... 340/310.01 | 6,785,592 | B1 | 8/2004 | Smith et al. ................ 700/291 |
| 5,994,999 | A | 11/1999 | Ebersohl ................. 340/310.01 | 6,788,745 | B1 | 9/2004 | Lim et al. .................... 375/297 |
| 6,014,386 | A | 1/2000 | Abraham ................... 370/485 | 6,809,633 | B1 | 10/2004 | Cern ................... 340/310.07 |
| 6,023,106 | A | 2/2000 | Abraham ........................ 307/3 | 6,844,809 | B1 | 1/2005 | Manis et al. ........... 340/310.02 |
| 6,037,650 | A | 3/2000 | Rickard ........................ 307/89 | 6,844,810 | B1 | 1/2005 | Cern ................... 340/310.07 |
| 6,037,857 | A | 3/2000 | Behrens et al. ........ 340/310.03 | 6,854,059 | B1 | 2/2005 | Gardner ..................... 380/277 |
| 6,040,759 | A | 3/2000 | Sanderson ............. 340/310.01 | 2001/0038329 | A1 | 11/2001 | Diamanti et al. ....... 340/310.01 |
| 6,091,932 | A | 7/2000 | Langlais ..................... 455/5.1 | 2001/0038343 | A1 | 11/2001 | Meyer et al. .......... 340/870.02 |
| 6,104,707 | A | 8/2000 | Abraham ................... 370/295 | 2001/0045888 | A1 | 11/2001 | Kline .................... 340/310.01 |
| 6,121,765 | A | 9/2000 | Carlson ....................... 323/359 | 2001/0052843 | A1 | 12/2001 | Wiesman et al. ....... 340/310.01 |
| 6,130,896 | A | 10/2000 | Lueker et al. ............... 370/469 | 2001/0054953 | A1 | 12/2001 | Kline .................... 340/310.01 |
| 6,140,911 | A | 10/2000 | Fisher et al. ........... 340/310.01 | 2002/0002040 | A1 | 1/2002 | Kline et al. ................. 455/402 |
| 6,141,634 | A | 10/2000 | Flint et al. ..................... 703/18 | 2002/0010870 | A1 | 1/2002 | Gardner ..................... 713/300 |
| 6,144,292 | A | 11/2000 | Brown ................. 340/310.02 | 2002/0014884 | A1 | 2/2002 | Chung .......................... 324/74 |
| 6,151,330 | A | 11/2000 | Liberman ................... 370/449 | 2002/0027496 | A1 | 3/2002 | Cern ................... 340/310.01 |
| 6,151,480 | A | 11/2000 | Fischer et al. ......... 340/310.01 | 2002/0041228 | A1 | 4/2002 | Zhang ................... 340/310.01 |
| 6,154,488 | A | 11/2000 | Hunt ........................... 375/219 | 2002/0048368 | A1 | 4/2002 | Gardner ..................... 380/277 |
| 6,157,292 | A | 12/2000 | Piercy et al. .......... 340/310.01 | 2002/0060624 | A1 | 5/2002 | Zhang ................... 340/310.01 |
| 6,172,597 | B1 | 1/2001 | Brown ................. 340/310.02 | 2002/0071452 | A1 | 6/2002 | Abraham ................... 370/480 |
| 6,175,860 | B1 | 1/2001 | Gaucher ..................... 709/208 | 2002/0080010 | A1 | 6/2002 | Zhang ................... 340/310.06 |
| 6,177,849 | B1 | 1/2001 | Barsellotti et al. ........... 333/177 | 2002/0095662 | A1 | 7/2002 | Ashlock et al. .............. 717/136 |
| 6,212,658 | B1 | 4/2001 | Le Van Suu ............... 714/749 | 2002/0097953 | A1 | 7/2002 | Kline ............................ 385/24 |
| 6,226,166 | B1 | 5/2001 | Gumley et al. ............. 361/118 | 2002/0098867 | A1 | 7/2002 | Meiksen et al. ............. 455/560 |
| 6,229,434 | B1 | 5/2001 | Knapp et al. .......... 340/310.01 | 2002/0098868 | A1 | 7/2002 | Meiksen et al. ............. 455/560 |
| 6,239,722 | B1 | 5/2001 | Colton et al. .......... 340/870.02 | 2002/0105413 | A1 | 8/2002 | Cern ................... 340/310.01 |
| 6,243,413 | B1 | 6/2001 | Beukema ................... 375/222 | 2002/0109575 | A1 | 8/2002 | Sanderson ............. 340/310.01 |
| 6,243,571 | B1 | 6/2001 | Bullock et al. ............. 455/402 | 2002/0110310 | A1 | 8/2002 | Kline ............................ 385/15 |
| 6,255,805 | B1 | 7/2001 | Papalia et al. .............. 323/207 | 2002/0110311 | A1 | 8/2002 | Kline ............................ 385/15 |
| 6,255,935 | B1 | 7/2001 | Lehmann et al. ....... 340/310.07 | 2002/0118101 | A1 | 8/2002 | Kline .................... 340/310.01 |
| 6,275,144 | B1 | 8/2001 | Rumbaugh ............. 340/310.01 | 2002/0121963 | A1 | 9/2002 | Kline .................... 340/310.01 |
| 6,282,405 | B1 | 8/2001 | Brown .......................... 725/79 | 2002/0140547 | A1 | 10/2002 | Litwin, Jr. et al. ....... 340/310.01 |
| 6,297,729 | B1 | 10/2001 | Abali et al. ............. 340/310.01 | 2002/0154010 | A1 | 10/2002 | Kline .................... 340/310.01 |
| 6,297,730 | B1 | 10/2001 | Dickinson .............. 340/310.01 | 2002/0171535 | A1 | 11/2002 | Cern ..................... 340/310.07 |
| 6,300,881 | B1 | 10/2001 | Yee et al. ............... 340/870.02 | 2003/0007570 | A1 | 1/2003 | Kim et al. .................... 375/303 |
| 6,313,738 | B1 | 11/2001 | Wynn .................... 340/310.03 | 2003/0007576 | A1 | 1/2003 | Alavi et al. .................. 375/329 |
| 6,317,031 | B1 | 11/2001 | Rickard ................. 340/310.03 | 2003/0062990 | A1 | 4/2003 | Schaeffer, Jr. et al. .. 340/310.01 |
| 6,331,814 | B1 | 12/2001 | Albano et al. ......... 340/310.01 | 2003/0067910 | A1 | 4/2003 | Razazian et al. ............ 370/352 |
| 6,335,672 | B1 | 1/2002 | Tumlin et al. ............... 336/175 | 2003/0090368 | A1 | 5/2003 | Ide ........................ 340/310.06 |
| 6,373,376 | B1 | 4/2002 | Adams et al. ......... 340/310.01 | 2003/0103307 | A1 | 6/2003 | Dostert ....................... 361/113 |
| 6,384,580 | B1 | 5/2002 | Ochoa et al. ................ 323/207 | 2003/0107477 | A1 | 6/2003 | Ide ........................ 340/310.01 |
| 6,396,391 | B1 | 5/2002 | Binder .................. 340/310.01 | 2003/0129978 | A1 | 7/2003 | Akiyama et al. ........... 455/426.1 |
| 6,396,392 | B1 | 5/2002 | Abraham ............... 340/310.01 | 2003/0149784 | A1 | 8/2003 | Ide ............................ 709/231 |
| 6,404,773 | B1 | 6/2002 | Williams et al. ............. 370/463 | 2003/0179080 | A1 | 9/2003 | Mollenkopf et al. .... 340/310.01 |
| 6,407,987 | B1 | 6/2002 | Abraham ................... 370/295 | 2003/0184433 | A1 | 10/2003 | Zalitzky et al. ......... 340/310.06 |
| 6,414,578 | B1 | 7/2002 | Jitaru ........................... 336/170 | 2003/0210734 | A1 | 11/2003 | Kaku .......................... 375/148 |
| 6,417,762 | B1 | 7/2002 | Comer ................... 340/310.01 | 2003/0222747 | A1 | 12/2003 | Perkinson et al. ........... 336/178 |
| 6,425,852 | B1 | 7/2002 | Epstein et al. ................ 600/13 | 2003/0224784 | A1 | 12/2003 | Hunt et al. ................. 455/426.2 |
| 6,441,723 | B1 | 8/2002 | Mansfield, Jr. et al. . 340/310.01 | 2004/0037317 | A1 | 2/2004 | Zalitzky et al. ............. 370/466 |

| | | | | |
|---|---|---|---|---|
| 2004/0054425 A1 | 3/2004 | Elmore ............ 700/1 |
| 2004/0064782 A1 | 4/2004 | Lerner et al. ............ 714/800 |
| 2004/0067745 A1 | 4/2004 | Belsak ............ 455/402 |
| 2004/0070912 A1 | 4/2004 | Kopp ............ 361/119 |
| 2004/0083066 A1 | 4/2004 | Hayes et al. ............ 702/62 |
| 2004/0085172 A1 | 5/2004 | Cern ............ 336/174 |
| 2004/0242185 A1 | 12/2004 | Lee ............ 455/402 |
| 2005/0007241 A1 | 1/2005 | Kline ............ 340/310.01 |

FOREIGN PATENT DOCUMENTS

| | | |
|---|---|---|
| DE | 100 08 602 A1 | 6/2001 |
| DE | 100 12 235 C2 | 12/2001 |
| DE | 100 47 648 A1 | 4/2002 |
| DE | 100 61 584 A1 | 6/2002 |
| DE | 100 61 586 A1 | 6/2002 |
| DE | 101 00 181 A1 | 7/2002 |
| DE | 101 03 53 A1 | 8/2002 |
| DE | 100 59 564 A1 | 9/2002 |
| DE | 100 48 348 C2 | 11/2002 |
| DE | 101 190 039 A1 | 12/2002 |
| DE | 101 190 040 A1 | 12/2002 |
| DE | 100 26 930 C2 | 1/2003 |
| DE | 100 26 931 C2 | 1/2003 |
| DE | 100 42 958 C2 | 1/2003 |
| DE | 101 47 918 A1 | 4/2003 |
| DE | 101 47 916 C1 | 5/2003 |
| DE | 101 46 982 C1 | 6/2003 |
| DE | 101 47 915 C1 | 6/2003 |
| DE | 101 47 913 C1 | 7/2003 |
| EP | 0 141 673 A2 | 5/1985 |
| EP | 0 581 351 A1 | 2/1994 |
| EP | 0 632 602 A2 | 1/1995 |
| EP | 0 470 185 B1 | 11/1995 |
| EP | 0 822 721 A2 | 2/1998 |
| EP | 0 822 721 A3 | 2/1998 |
| EP | 0 913 955 A2 | 5/1999 |
| EP | 0 933 883 A2 | 8/1999 |
| EP | 0 933 883 A3 | 8/1999 |
| EP | 0 948 143 A2 | 10/1999 |
| EP | 0 959 569 A1 | 11/1999 |
| EP | 1 011 235 A2 | 6/2000 |
| EP | 1 014 640 A2 | 6/2000 |
| EP | 1 043 866 A2 | 10/2000 |
| EP | 1 043 866 A3 | 10/2000 |
| EP | 1 075 091 A1 | 2/2001 |
| EP | 0 916 194 B1 | 9/2001 |
| EP | 1 011 235 A3 | 5/2002 |
| EP | 1 213 849 A1 | 6/2002 |
| EP | 1 217 760 A1 | 6/2002 |
| EP | 1 014 640 A3 | 7/2002 |
| EP | 1 021 866 B1 | 10/2002 |
| EP | 1 251 646 A2 | 10/2002 |
| EP | 1 253 699 A2 | 10/2002 |
| ES | 2 122 920 A1 | 12/1998 |
| GB | 2 293 950 A | 4/1996 |
| GB | 2 315 937 A | 2/1998 |
| GB | 2 331 683 A | 5/1999 |
| GB | 2 335 335 A | 9/1999 |
| GB | 2 341 776 A | 3/2000 |
| GB | 2 342 264 A | 4/2000 |
| GB | 2 347 601 A | 9/2000 |
| JP | 1276933 | 11/1989 |
| NZ | 276741 | 7/1998 |
| WO | 95/29536 A1 | 11/1995 |
| WO | 98/01905 A1 | 1/1998 |
| WO | 98/33258 A2 | 7/1998 |
| WO | 98/33258 A3 | 7/1998 |
| WO | 98/40980 A1 | 9/1998 |
| WO | 99/59261 A1 | 11/1999 |
| WO | 00/16496 A2 | 3/2000 |
| WO | 00/59076 A1 | 10/2000 |
| WO | 00/60701 A1 | 10/2000 |
| WO | 00/60822 A1 | 10/2000 |
| WO | 01/08321 A1 | 2/2001 |
| WO | 01/43305 A1 | 6/2001 |
| WO | 01/50625 A2 | 7/2001 |
| WO | 01/50625 A3 | 7/2001 |
| WO | 01/50628 A1 | 7/2001 |
| WO | 01/50629 A1 | 7/2001 |
| WO | 01/63787 A1 | 8/2001 |
| WO | 01/82497 A1 | 11/2001 |
| WO | 02/17509 A1 | 2/2002 |
| WO | 02/37712 A1 | 5/2002 |
| WO | 02/054605 A1 | 7/2002 |
| WO | 02/065684 A2 | 8/2002 |
| WO | 02/089352 A1 | 11/2002 |
| WO | 02/089353 A1 | 11/2002 |
| WO | 03/009083 A2 | 1/2003 |
| WO | 03/009083 A3 | 1/2003 |
| WO | 03/010896 A1 | 2/2003 |
| WO | 03/030396 A2 | 4/2003 |
| WO | 03/034608 A2 | 4/2003 |
| WO | 03/039022 A1 | 5/2003 |
| WO | 03/040732 A2 | 5/2003 |
| WO | 03/056715 A1 | 7/2003 |
| WO | 2004/008656 A1 | 1/2004 |
| WO | 2004/021600 A1 | 3/2004 |

OTHER PUBLICATIONS

"Archnet: Automatic Meter Reading System Power Line Carrier Communication", www.archnetco.com/english/product/product_sl.htm, © 2001, 3 pages.

"Power Line Communications Solutions", www.echelon.com/products/oem/transceivers/powerline/default.htm, ©2002, 2 pages.

"Texas Instruments: System Block Diagrams; Power Line Communication (Generic)", http://focus.ti.com/docs/apps/catalog/resources/blockdiagram.jhtml?bdId=638, © 1995-2002 1 page.

Plexeon Logistics, Inc., "Power Line Communications", www.plexeon.com/power.html, © 1998-2003, 2 pages.

Chang, S.S.L., "Power-Line Carrier", *Fundamentals Handbook of Electrical and Computer Engineering*, vol. II-Communication, Control, Devices and Systems, John Wiley & Sons, New York, 1983, 617-627.

Kilbourne, B. "EEI Electric Perspectives: The Final Connection", www.eei.org/ep/editorial/Jul-01/0701conenct.htm, Jul./Aug. 2001, 7 pages.

Sado, WN. et al., "Personal Communication on Residential Power Lines- Assessment of Channel Parameters", Nov. 6-10, 1995, *IEEE*, 532-537.

LONWORKS Engineering Bulletin, "Demand Side Management with LONWORKS® Power Line Transceivers," Dec. 1996, 36 pages.

HomePlug™ Powerline Alliance, HomePlug Initial Draft Medium Interface Specification, May 19, 2000, 109 pages.

HomePlug™ Powerline Alliance, HomePlug 0.5 Draft Medium Interface Specification, Nov. 28, 2000, 133 pages.

HomePlug™ Powerline Alliance, HomePlug Initital Draft Medium Interface Specification, Jul. 27, 2000, 109 pages.

HomePlug™ Powerline Alliance, HomePlug 1.01 Specification, Dec. 1, 2001, 139 pages.

Summary of an IEEE Guide for Power-Line Carrier Applications, A Report by the Power System Communications Committee, *IEEE Transactions on Power Apparatus and Systems*, vol. PAS-99, No. 6, Nov./Dec. 1980, pp. 2334-2337.

De Wilde, W. R. et al., "Upwards to a Reliable Bi-Directional Communication Link on the LV Power Supplies for Utility Services: Field Tests in Belgium," Apr. 3-5, 1990, *Sixth International Conference on*, Manchester, UK, pp. 168-172.

Tanaka, M., "Transmission Characteristics of a Power Line Used for Data Communications at High Frequencies," IEEE Transactions on Consumer Electronics, Feb. 1989, vol. 35, No. 1, pp. 37-42.

Hasler, E. F. et al., "Communication Systems Using Bundle Conductor Overhead Power Lines," IEEE Transactions on Power Apparatus and Systems, Mar./Apr. 1975, vol. PAS-94, No. 2, pp. 344-349.

IEEE Guide for Power-Line Carrier Applications, ANSI/IEEE Std 643-1980, © 1980 by The Institute of Electrical and Electronics Engineers, Inc., pp. 1-80.

Hatori, M. et al., "Home Informatization and Standardization of Home Bus," IEEE Transactions on Consumer Electronics, Aug. 1986, vol. CE-32, No. 3, pp. 542-549.

Hunt, J. M. et al., "Electrical Energy Monitoring and Control System for the Home," IEEE Transactions on Consumer Electronics, Aug. 1986, vol. CE-32, No. 3, pp. 578-583.

Gutzmiller, F. W. et al., "Homenet: A Control Network for Consumer Applications," IEEE Transactions on Consumer Electronics, Aug. 1983, vol. CE-29, No. 3, pp. 297-304.

Burrascano, P. et al., "Digital Signal Transmission on Power Line Carrier Channels: An Introduction,". IEEE Transactions on Power Delivery, Jan. 1987, vol. PWRD-2, No. 1, pp. 50-56.

Burr, A. G. et al., "Effect of HF Broadcast Interference on PowerLine Telecommunications Above 1 Mhz," © 1998 IEEE, pp. 2870-2875.

Onunga, J. et al., "Distribution Line Communications Using CSMA Access Control with Priority Acknowledgements," IEEE Transactions on Power Delivery, Apr. 1989, vol. 4, No. 2, pp. 878-886.

Tanaka, M., "High Frequency Noise Power Spectrum, Impedance and Transmission Loss of Power Line in Japan on Intrabuilding Power Line Communications," IEEE Transactions on Consumer Electronics, May 1988, vol. 34, No. 2, pp. 321-326.

Meng, H. et al., "A Transmission Line Model for High-Frequency Power Line Communication Channel," © 2002 IEEE, pp. 1290-1295.

Burrascano, P. et al., "Performance Evaluation of Digital Signal Transmission Channels on Coronating Power Lines," © 1988 IEEE, pp. 365-368.

DiClementi, D. A. et al., "Electrical Distribution System Power Line Characterization," © 1996 IEEE, pp. 271-276.

Abraham, K. C. et al., "A Novel High-Speed PLC Communication Modem," IEEE Transactions on Power Delivery, Oct. 1992, vol. 7, No. 4, pp. 1760-1768.

Yoshitoshi, M. et al., "Proposed Interface Specifications for Home Bus," IEEE Transactions on Consumer Electronics, Aug. 1986, vol. CE-32, No. 3, pp. 550-557.

O'Neal, Jr., J. B., "The Residential Power Circuit as a Communication Medium," IEEE Transactions on Consumer Electronics, Aug. 1986, vol. CE-32, No. 3, pp. 567-577.

Dostert, K., "EMC Aspects of High Speed Powerline Communications," Proceedings of the 15th International Wroclaw Symposium and Exhibition on Electromagnetic Capability, Jun. 27-30, 2000; Wroclaw, Poland, pp. 98-102.

Piety, R. A., "Intrabuilding Data Transmission Using Power-Line Wiring," Hewlett-Packard Journal, May 1987, pp. 35-40.

"ABB joins Main.net's subsidiary, PPC, as shareholder and strategic partner for Power Line Communications," Mannheim, Germany/ Kfar Saba, Israel, Oct. 8, 2002, 2 pages.

Dostert, K., Powerline Communications, Ch. 5, pp. 286, 288-292, Prentice Hall PTR, Upper Saddle River, NJ © 2001.

U.S. Appl. No. 09/765,910, filed Jan. 19, 2001, Kline.
U.S. Appl. No. 09/805,638, filed Mar. 14, 2001, Kline.
U.S. Appl. No. 09/835,532, filed Apr. 16, 2001, Kline.
U.S. Appl. No. 09/837,972, filed Apr. 19, 2001, Kline et al.
U.S. Appl. No. 09/912,633, filed Jul. 25, 2001, Kline.
U.S. Appl. No. 09/915,459, filed Jul. 26, 2001, Kline.
U.S. Appl. No. 09/924,730, filed Aug. 8, 2001, Kline.
U.S. Appl. No. 10/016,998, filed Dec. 14, 2001, Kline.
U.S. Appl. No. 10/036,914, filed Dec. 21, 2001, Mollenkopf et al.
U.S. Appl. No. 10/075,708, filed Feb. 14, 2002, Kline.
U.S. Appl. No. 10/075,332, filed Feb. 14, 2002, Kline.
U.S. Appl. No. 10/150,694, filed May 16, 2002, Gidge.
U.S. Appl. No. 10/165,992, filed Jun. 10, 2002, Kline.
U.S. Appl. No. 10/176,500, filed Jun. 21, 2002, Pridmore, Jr. et al.
U.S. Appl. No. 10/293,799, filed Nov. 13, 2002, Huebner.
U.S. Appl. No. 10/292,714, filed Nov. 12, 2002, Cope.
U.S. Appl. No. 10/315,725, filed Dec. 10, 2002, Cope et al.
U.S. Appl. No. 10/319,317, filed Dec. 13, 2002, Mollenkopf et al.
U.S. Appl. No. 10/348,164, filed Jan. 21, 2003, Cope et al.
U.S. Appl. No. 10/385,899, filed Mar. 10, 2003, Mollenkopf.

Patent Abstracts of Japan, Japanese Publication No. 10200544 A2, published Jul. 31, 1998, (Matsushita Electric Works, LTD).

Tohoku Electric Power, Co., Inc., "Tohoku Electric Develops High-Speed Communications System Using Power Distribution Lines," Tohoku Currents, Spring 1998, 8(1), 2 pages (http://www.tohoku-epco.co.jp/profil/kurozu/c_vol8_1/art04.htm).

Power Line Communications Conference entitled, "PLC, A New Competitor in Broadband Internet Access," Dec. 11-12, 2001, Washington, D.C., 60 pages.

Rivkin, S. R., "Co-Evolution of Electric & Telecommunications Networks," The Electricity Journal, May 1998, 71-76.

Marketing Assessment Presentation entitled "Powerline Telecommunications," The Shpigler Group for CITI PLT, Jul. 16, 2002, 9 pages.

Campbell, C., presentation entitled "Building a Business Case for PLC: Lessons Learned From the Communication Industry Trenches," KPMG Consulting, Jul. 16, 2002, 5 pages.

"Embedded Power Line Carrier Modem," Archnet Electronic Technology, http://www.archnetco.com/english/product/ATL90.htm, 2001, 3 pages.

"Archnet: Automatic Meter Reading System Power Line Carrier Communication", www.archnetco.com/english/product/product_sl.htm, 3 pages.

"Power Line Communications Solutions", www.echelon.com/products/oem/transceivers/powerline/default.htm, 2 pages.

"Texas Instruments: System Block Diagrams; Power Line Communication (Generic)", http://focus.ti.com/docs/apps/catalog/resources/blockdiagram.jhtml?bdId=638, 1 page.

Feduschak, N.A., "Waiting in the Wings: Is Powerline Technology Ready to Compete with Cable?", Mar. 2001, www.cabletoday.com/ic2/archives/0301/0301powerline.htm, 5 pages.

"Signalling on Low-Voltage Electrical Installations in the Frequency Band 3kHz to 148.5kHz-Part 4: Filters at the Interface of the Indoor and Outdoor Electricity Network", CLC SC 105A (Secretariat) May 1992, 62, 1-11.

"Intellon Corporation Test Summary for Transformerless Coupler Study", Intellon No News Wires, Dec. 24, 1998, DOT/NHTSA Order No. DTNH22-98-P-07632, pp. 1-18.

EMETCON Automated Distribution System, ABB Power T & D Company, Inc., Jan. 1990, Raleigh, North Carolina, No. B-919A, 14 pages.

"Dedicated Passive Backbone for Power Line Communications", IBM Technical Disclosure Bulletin, Jul. 1997, 40(7), 183-185.

Coaxial Feeder Cables [Engineered Notes], PYE Telecommunications Limited Publication Ref. No. TSP507/1, Jun. 1975, Cambridge, England, 15 pages.

"Centralized Commercial Building Applications with the Lonworks® PLT-21 Power Line Transceiver", Lonworks Engineering Bulletin, Echelon, Apr. 1997, pp. 1-22.

Plexeon Logistics, Inc., "Power Line Communications", www.plexeon.com/power.html, 2 pages.

"EMETCON Automated Distribution System: Communications Guide", Westinghouse ABB Power T & D Company Technical Manual 42-6001A, Sep. 1989, 55 pages.

Abraham, K.C. et al., "A Novel High-Speed PLC Communcation Modem", IEEE Transactions on Power Delivery, 1992, 7(4), 1760-1768.

J.M. Barstow., "A Carrier Telephone System for Rural Service", AIEE Transactions, 1947, 66, 301-307.

Chang, S.S.L., "Power-Line Carrier", Fundamentals Handbook of Electrical and Computer Engineering, vol. II-Communication, Control, Devices and Systems, John Wiley & Sons, 617-627.

Chen, Y-F. et al. "Baseband Transceiver Design of a 128-Kbps Power-Line Modem for Household Applications", IEEE Transactions on Power Delivery, 2002, 17(2), 338-344.

Coakley, N.G. et al., "Real-Time Control of a Servosystem Using the Inverter-Fed Power Lines to Communicate Sensor Feedback", IEEE Transactions on Industrial Electronics, 1999, 46(2), 360-369.

Esmailian, T. et al., "A Discrete Multitone Power Line Communication System", *Department of Electrical and Computer Engineering*, University of Toronto, Ontario Canada, 2000 IEEE, pp. 2953-2956.

Kawamura, A. et al., "Autonomous Decentralized Manufacturing System Using High-speed Network with Inductive Transmission of Data and Power", *IEEE*, 1996, 940-945.

Kilbourne, B. "EEI Electric Perspectives: The Final Connection", www.eei.org/ep/editiorial/Jul-01/0701conenct.htm, 7 pages.

Kim, W-O., et al., "A Control Network Architecture Based on EIA-709.1 Protocol for Power Line Data Communications", *IEEE Transactions on Consumer Electronics*, 2002, 48(3), 650-655.

Lim, C.K. et al., "Development of a Test Bed for High-Speed Power Line Communications", School of Electrical and Electronic Engineering, Nanyang Technological University, Singapore, *IEEE*, 2000, 451-456.

Lokken, G. et al., "The Proposed Wisconsin electric Power Company Load Management System Using Power Line Carrier Over Distribution Lines", *1976 National Telecommunications Conference, IEEE*, 1976, 2.2-12.2-3.

Marthe, E. et al., "Indoor Radiated Emission Associated with Power Line Communication Systems", *Swiss Federal Institute of Technology Power Systems Laboratory IEEE*, 2001, 517-520.

Naredo, J.L. et al., "Design of Power Line Carrier Systems on Multitransposed Delta Transmission Lines", *IEEE Transactions on Power Delivery*, 1991, 6(3), 952-958.

Nichols, K., "Build a Pair of Line-Carrier Modems", *CRC Electronics-Radio Electronics*, 1988, 87-91.

Okazaki, H, et al., "A Transmitting, and Receiving Method for CDMA Communications Over Indoor Electrical Power Lines", *IEEE*, 1998, pp. VI-522-VI-528.

B. Don Russell, "Communication Alternatives for Distribution Metering and Load Management", *IEEE Transactions on Power Apparatus and Systems*, 1980, vol. PAS-99(4), pp. 1448-1455.

Sado, WN. et al., "Personal Communication on Residential Power Lines- Assessment of Channel Parameters", *IEEE*, 532-537.

International Search Report dated May 2, 2001, from PCT/US01/01810.

International Search dated Jul. 16, 2001, from PCT/US01/12699.

International Search Report dated Oct. 22, 2001, from PCT/US01/12291.

International Search Report dated Jun. 5, 2002, from PCT/US01/48064.

Written Opinion dated May 15, 2002, from PCT/US01/12699.

International Search Report dated Jun. 24, 2002, from PCT/US02/04310.

International Search Report dated Aug. 7, 2002, from PCT/US02/04300.

Written Opinion dated Mar. 21, 2003, from PCT/US02/04300.

* cited by examiner

FLOATING POWER SUPPLY AND METHOD OF USING THE SAME

FIELD OF THE INVENTION

The present invention generally relates to a power supply and more particularly, to a floating direct current (DC) power supply for use in a system providing data communications through a power line and method of using the same.

BACKGROUND OF THE INVENTION

Well-established power distribution systems exist throughout most of the United States, and other countries, that provide power to customers via power lines. With some modification, the infrastructure of the existing power distribution systems can be used to provide data communication in addition to power delivery, thereby forming a power distribution communication system. In other words, existing power lines, that already have been run to many homes and offices, can be used to carry data signals to and from the homes and offices. These data signals are communicated on and off the power lines at various points in the power distribution communication system, such as, for example, near homes, offices, Internet service providers, and the like.

While the concept may sound simple, there are many challenges to overcome in order to use power lines for data communication. Power distribution systems include numerous sections, which transmit power at different voltages. The transition from one section to another typically is accomplished with a transformer. The sections of the power line distribution system that are connected to the customers typically are low voltage (LV) sections having a voltage between 100 volts and 240 volts, depending on the system. In the United States, the low voltage section typically is about 120 volts (120V). The sections of the power distribution system that provide the power to the low voltage sections are referred to as the medium voltage (MV) sections. The voltage of the MV section is in the range of 1,000 volts to 100,000 volts. The transition from the MV section to the LV section of the power distribution system typically is accomplished with a distribution transformer, which converts the higher voltage of the MV section to the lower voltage of the LV section.

Power system transformers are one obstacle to using power distribution lines for data communication. Transformers act as a low-pass filter, passing the low frequency signals (e.g., the 50 or 60 Hz power signals) and impeding high frequency signals (e.g., frequencies typically used for data communication) from passing through the transformer. As such, power distribution communication systems face the challenge of passing the data signals around, or through, the distribution transformers.

As discussed, medium voltage power lines can operate from about 1000 V to about 100 kV, and often have high current flows. The transformer bypass devices couple data to and from the medium voltage power line—often processing the data signals with conventional signal processing circuitry that is typically powered by voltages in the range of 3.3 volts to 5 volts direct current (DC).

Figure 1:
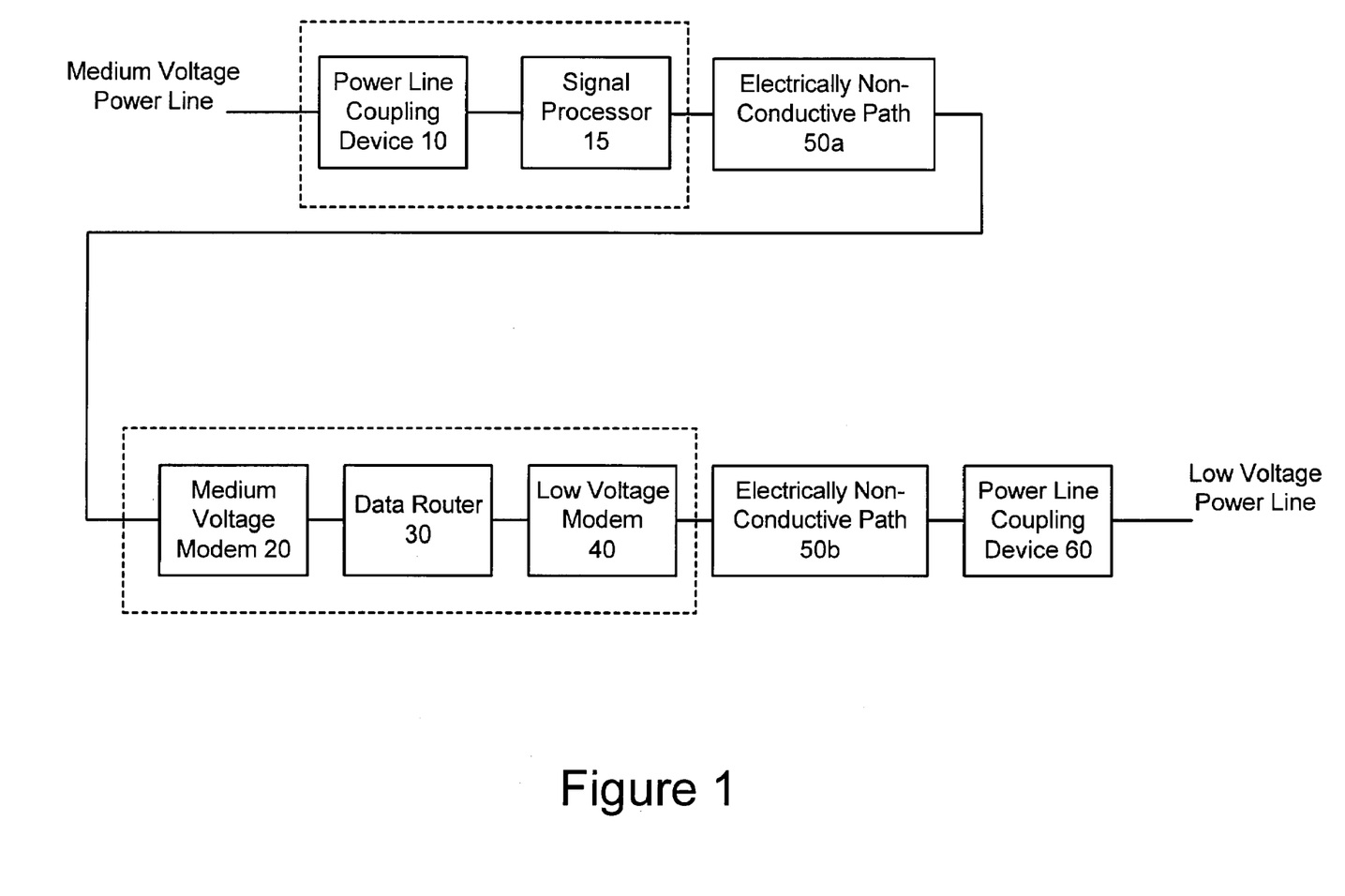
FIG. 1 is a schematic representation illustrating an example transformer bypass device with which the present invention may be used.

FIG. 1 is a schematic representation illustrating an example of a bypass system having a power line coupler 10 that couples data to and/or from the medium voltage power line. From the power line coupler 10 the data signals are coupled to a signal processor 15, an electrically non-conductive path 50a, a medium voltage modem 20, a data router 30, a low voltage modem 40, a second electrically non-conductive path 50b, a low voltage power line coupler 60, and on to a low voltage power line. Data flow from the low voltage power line to the medium voltage power line may pass through the same components in the opposite order as will be evident to those skilled in the art. This example bypass device includes two non-electrically conductive paths 50a and 50b, which permit the flow of data signals, but provide electrical isolation between the medium voltage power line and the low voltage power line. Thus, the non-electrically conductive paths 50a and 50b prevent the high voltages of the medium voltage power line from reaching the low voltage power lines and the customer premises while permitting the bi-directional communication of data signals around the transformer. Such isolation is a very important component of such systems as it ensures the safety of individuals and property, and prevents damage of equipment, using the low voltage power lines by preventing the medium voltage power from reaching the low voltage power lines.

The power line coupler 10 and/or the signal processor 15 of the bypass device may require a direct current power supply to power the electronics of these functional components. The voltage output of such a power supply typically is on the order of 3.3 volts to 5 volts DC. It would be undesirable, however, to directly connect the low voltage power line to a power supply for powering the circuitry comprising these components (the power line coupler 10 and the signal processor 15) because such a connection would not provide the necessary isolation between the low voltage and medium voltage power lines.

Prior art solutions to this problem include extracting power from the medium voltage power line and using this power to power the electronics on the medium voltage side of the electrical non-conductive paths. Some of the existing means of drawing power from the medium voltage power line include inductively or capacitively coupling power from the power line. However, the inductive method is difficult to implement due to the varying current on the medium voltage power line, which may vary from less than 1 amp to 500 amps. Similarly, capacitive coupling may require extremely large capacitors (e.g., a 10,000 volt rating) and face other technical challenges.

The power supply of the present invention provides a technique for supplying power to the medium voltage side of an isolation device, while maintaining the electrical isolation between the low voltage and medium voltage power lines. These and other advantages are provided by various embodiments of the present invention.

SUMMARY OF THE INVENTION

One embodiment of a power supply of the present invention comprises a transducer having a transducer output and a voltage regulator. The transducer is in communication with an electrically non-conductive medium, which may be a light pipe. The electrically non-conductive medium is in communication with a non-electrical energy source such as a light source, and the non-electrical energy source communicates energy to the transducer via the electrically non-conductive medium. The transducer converts the received light energy to electrical energy, which is supplied to the input of a voltage regulator. The regulator ground is coupled to a live conductor of a medium voltage power line. The regulator output therefore provides an output voltage that is ground referenced to the live conductor of the power line.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

Figure 2:
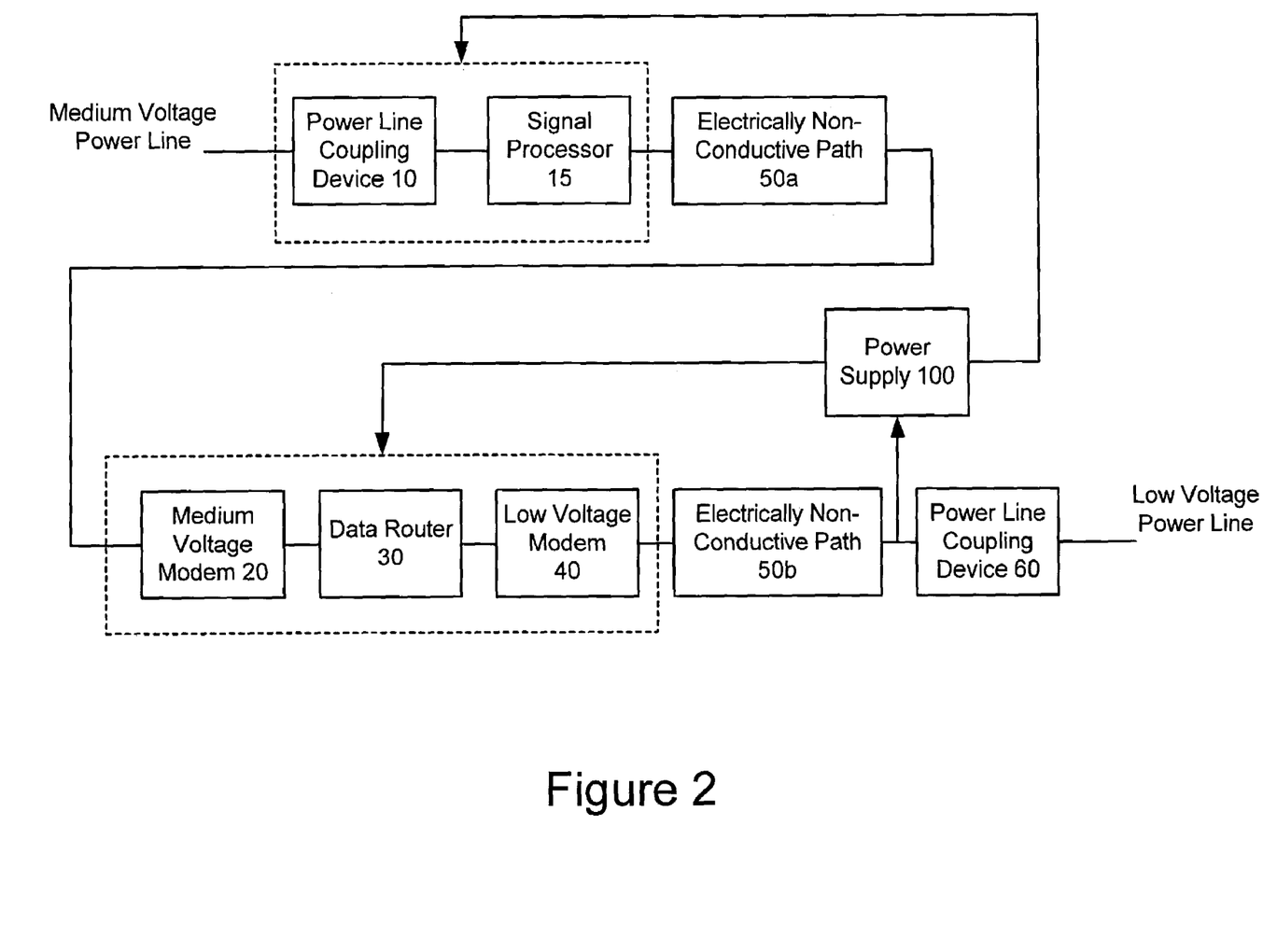
FIG. 2 is a schematic representation illustrating an example transformer bypass device using an embodiment of the present invention.

One application of the present invention is for use in a transformer bypass device, which is used to communicate data signals around a transformer that would otherwise filter such data signals, preventing them from passing through the transformer. FIG. 2 is a schematic representation illustrating such an example bypass system having a power line coupler 10 that couples data to and/or from the medium voltage power line and low voltage power line. From the power line coupler 10 the data signals are coupled to the signal processor 15, the electrically non-conductive path 50a, the medium voltage modem 20, the data router 30, the low voltage modem 40, the second electrically non-conductive path 50b, the low voltage power line coupler 60, and on to the low voltage power line. Data flow from the low voltage power line to the medium voltage power line may pass through the same components in the opposite order as will be evident to those skilled in the art.

This example bypass device includes two electrically non-conductive paths 50a and 50b, which permit the flow of data signals, but provide electrical isolation between the medium voltage power line and the low voltage power line. Thus, the non-electrically conductive paths 50a and 50b prevent the high voltages of the medium voltage power line from reaching the low voltage power lines and the customer premises while permitting the bi-directional communication of data signals around the transformer.

The power line coupler 10 and/or the signal processor 15 of the bypass device may require a direct current power supply to power the circuitry of these functional components. Similarly, the medium voltage modem 20, data router 30, and low voltage modem 40 may also require a low voltage direct current power supply. Typically, the voltage requirements of these types of circuitry are on the order of 3.3 volts to 5 volts DC. Other bypass devices may power these components (modem 20, data router 30, and modem 40) with a power supply that utilizes a low voltage isolating device, which may be a transformer.

As shown schematically in FIG. 2, a power supply 100 of the present invention provides a means of supplying power to the medium voltage side of an isolation device (e.g., non-electrically conductive paths 50a and/or 50b), which thereby maintains the isolation between the low voltage and medium voltage power lines. While this example bypass device includes two non-electrically conductive paths (50a and 50b) other bypass devices may employ only one. Likewise, the present invention may be used in other devices where electrical power supply isolation is desirable or necessary such as in a backhaul point used to communicate data between a medium voltage power line and a conventional telecommunications network.

Figure 3:
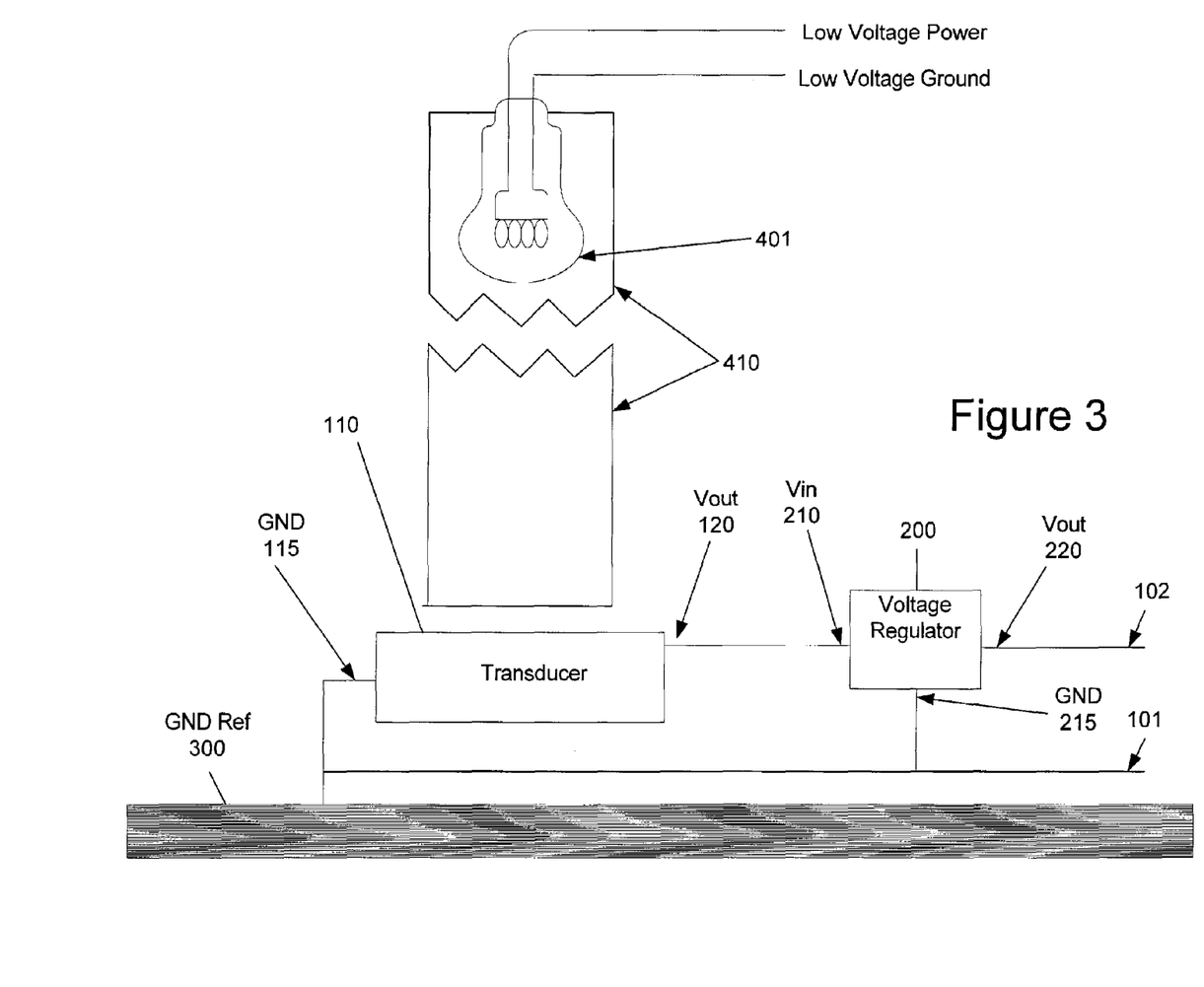
FIG. 3 is a schematic representation illustrating an example embodiment of the present invention.

Referring to FIG. 3, one example of the present invention includes a transducer 110, which, for example, may be a solar cell array or other means of converting non-electrical energy to electrical energy. For example, another example of a suitable transducer would be a thermocoupler for converting thermal energy to electrical energy. While the example embodiment below employs a light-to-electricity transducer such as a solar cell array providing a 5 volt output (referenced to its ground), any suitable transducer may be used, which may have any suitable output voltage.

The transducer 110 includes a ground 115 and a voltage output 120. When the 5 volt transducer 110 is transducing, the transducer 110 will maintain approximately a 5 volt potential between its voltage output 120 and its ground 115. In this embodiment, the ground 115 of the transducer 110 is electrically coupled to a ground reference 300, which, for example, may be a medium voltage power line. The voltage output 120 of the transducer 110 is connected to an input 210 of a voltage regulator 200.

In this embodiment, the voltage regulator 200 is a 3.3 volt voltage regulator. In other words, when enough power is supplied to its input, the voltage regulator 200 maintains a 3.3 volt potential between its voltage output 220 and its ground 215. The ground 215 of the voltage regulator 200 is connected to the ground reference 300. Consequently, the output of the voltage regulator 200 at its output 220 will be 3.3 volts referenced to the ground reference 300, which as discussed above may be a medium voltage power line. Thus, an output 102 of the power supply 100 referenced to its ground 101 will be 3.3 volts and "float" or ride on any voltage present on the ground reference 300. In this example, the ground reference 300 is a medium voltage power line having a voltage at 10 kilovolts (referenced to earth ground) at 60 Hz (the power signal) so the output of the power supply 100 will float or ride on the power signal—or in other words remain a substantially constant 3.3 volts relative to the power signal.

The ground connection of the power supply 100 to the medium voltage power line may be explicit or implicit. With respect to an explicit coupling, the ground 215 of the voltage regulator 200 and ground 115 of the transducer 110 may be directly connected (e.g., through a conductor) to the medium voltage power line or connected through a resistor. With respect to an implicit coupling, the ground 215 of the voltage regulator 200 and ground 115 of the transducer 110 is not coupled to the medium voltage power line through a conductor or an explicit conductive pathway. Specifically, with the implicit connection there is no "conductor" or wire coupling the ground 215 of the voltage regulator 200 and ground 115 of the transducer 110 to the medium voltage power line. Instead, the grounds 115 and 215 are connected to a local ground that is not connected to earth ground (or the medium voltage power line) and is shared by the components processing data signals received (or transmitted) through the medium voltage power line. This local ground will float. Due to leakage currents in the components processing the data on the medium voltage power line, the local ground will float to the potential of the medium voltage power line thereby providing an implicit connection. Because these components share the local ground with the voltage regulator 200 and transducer 110, the grounds 115 and 215 of the components will also float to the potential of the medium voltage line through this implicit connection.

The transducer 110 is in communication with a non-electrical energy source—an energy source that generates non-electrical energy (although the energy source may use electrical energy to do so. In this embodiment, the non-electrical energy source is a light source 401 that emits photons and may be a light bulb, a light emitting diode (LED), a laser, or other light emitting device or source. The transducer 110 is coupled to the non-electrically energy source 401 through a electrically non-conductive path 410, which in this embodiment may be a light tube, light pipe, fiber optic cable, or other suitable medium for conducting light energy from the light source 401.

The non-electrical energy source or light source 401 may be powered from the low voltage power line as indicated in the FIG. 3. For example, in this embodiment, the low voltage power line coupler 60 of the bypass device is coupled the low voltage power lines (e.g., conductively, capacitively, or inductively coupled), which includes a 120 volt power signal (and an associated ground, which may be earth ground) for powering the light source 401 or other non-electrical energy source. Thus, the non-electrical energy source or light source 401 is powered by a power source with a first voltage potential relative to earth ground (e.g., 120 volts) and the ground reference or medium voltage power line is at a second voltage potential relative to earth ground (e.g., 10,000 volts).

As indicated by the jagged edges of the electrically non-conductive path 410 shown in FIG. 3, the light source 401 may be remote from the transducer 110 and regulator 200 of the power supply 100. Keeping the light source 401 remote from the power supply 100 also allows the light source 401 to be remote from the medium voltage power line. Thus, the electrically non-conductive path 410 supplies energy to the power supply 100 and provides electrical isolation between the low voltage power line (that is supplying power to the light source 401) and the medium voltage power line.

In operation, power from the low voltage power line powers the light source 401, which emits light. The emitted light travels along the electrically non-conductive path 410 to the transducer 110 to which the electrically non-conductive path 410 is coupled. The transducer 110 converts the non-electrical energy to electrical energy, which in this embodiment results in an output voltage that is referenced to the medium voltage power line. The output voltage of the transducer 110 is supplied to the voltage regulator 200, which provides an output voltage 102 that is referenced to the medium voltage power line 300 or other ground reference.

Figure 4:
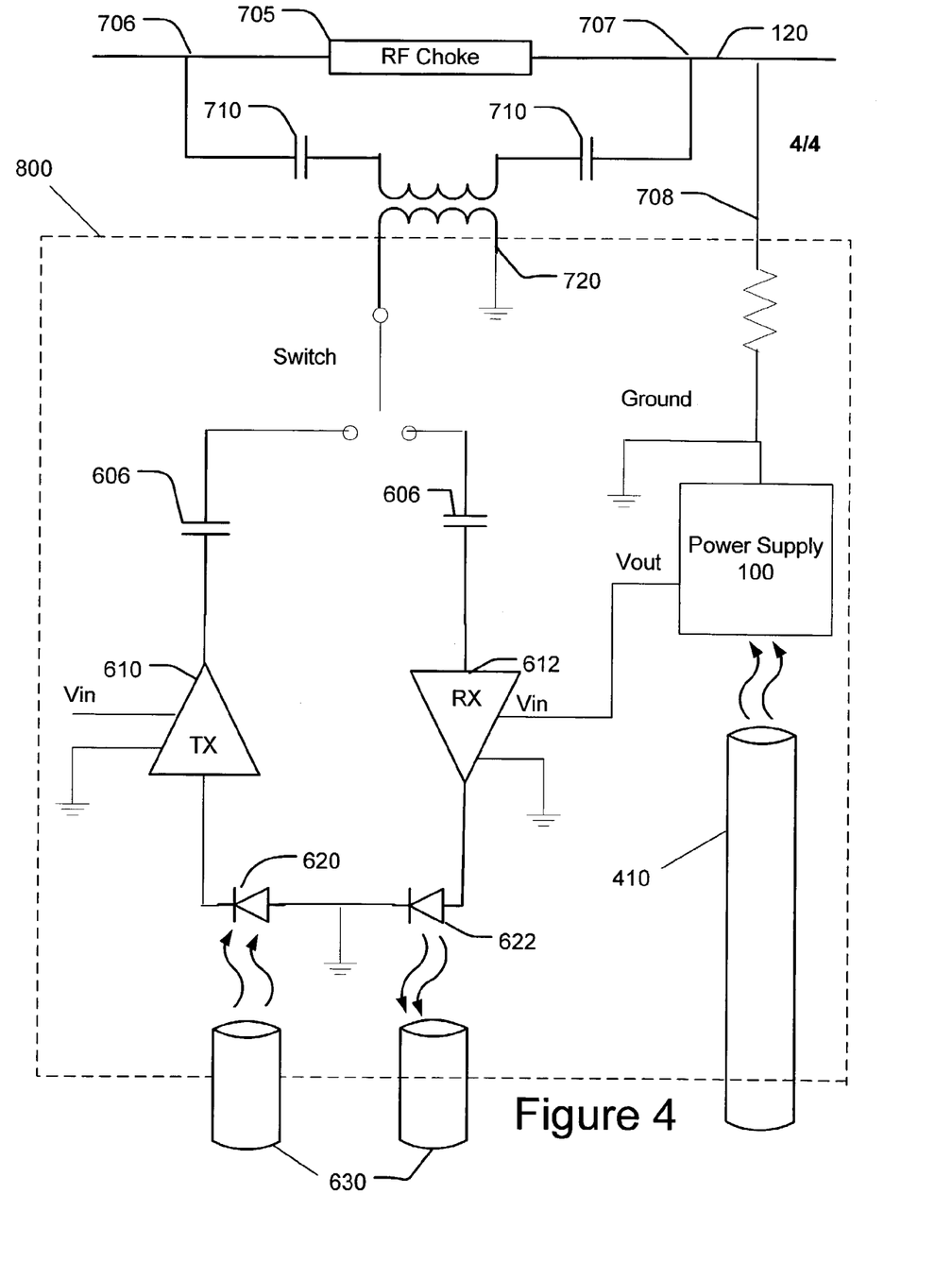
FIG. 4 is a schematic representation of an example embodiment of a coupling device and signal processor that are powered by an embodiment of the present invention.

One example of the power line coupling device 10, the signal processor 15, and the electrically non-conductive path 50a with which an embodiment of the present invention may be used is shown in FIG. 4. From an electrical perspective the coupling device 10 includes a radio frequency (RF) filter or RF choke 705 in series with the medium voltage power line 120 and disposed between the connection nodes 706 and 707. The RF choke 705 may be an impedance provided by ferrite inductors that are toroidal in shape and extend substantially around the medium voltage power line 120.

The RF choke 705 operates as a low pass filter. In other words, low frequency signals (e.g., a power signal having a frequency of 50 or 60 Hz) pass through the RF choke 705 relatively unimpeded (i.e., RF choke 705 can be modeled as a short circuit to low frequency signals). High frequency signals (e.g., a data signal), however, do not pass through the RF choke 705; rather, they are blocked by the RF choke 705 (i.e., the RF choke 705 can be modeled as a high impedance path to high frequency signals). As such, the voltage across the RF choke 705 includes data signals but substantially no power signals. This voltage (i.e., the voltage across the RF choke 705) is applied to a transformer 720 via capacitors 710 to receive data signals from the medium voltage power line 120. To transmit data signals to the medium voltage power line 120, the data signal is applied to the transformer 720, which in turn communicates the data signal to medium voltage power line 120 through the capacitors 710.

The transformer 720 may operate as a differential transceiver. The transformer 720 may operate to repeat data signals received from the MV power line to a receive circuitry 612 and to repeat data signals received from a transmit circuitry 610 to the MV power line. The transformer 720 and capacitors 710 also provide some electrical isolation between the medium voltage power line 120 and the low voltage power line. The transformer 720 and capacitors 710 also permit RF signals, such as data signals, to pass through and travel down the power line.

FIG. 4 also shows other components of the power line coupler 10 and signal processor 15 including the transmit circuitry 610, the receive circuitry 612, a transmit optoelectronic device 620 (e.g., a light emitting diode), and a receive optoelectronic device 622 (e.g., a photo detector).

The capacitors 606 are electrically connected between the transmit circuitry 610 and the receive circuitry 612 and the transformer 720. The transmit circuitry 610 and the receive circuitry 612 are electrically connected to the transmit optoelectronic device 620 and the receive optoelectronic device 622, respectively. The transmit optoelectronic device 620 and the receive optoelectronic device 622 are in communication with a data communication medium 630, which is an electrically non-conductive path for the communication of data signals and is an example of the electrically non-conductive path 50a shown in FIGS. 1 and 2.

In the embodiment illustrated in FIG. 4, the data communication medium 630 is a fiber optic cable that provides electrical power isolation between the medium voltage power line and low voltage power line. Other communication media may be used to provide such electrical power isolation such as wireless electrically non-conductive path or multiple fiber optic conductors.

As discussed above and as shown in FIG. 4, the power supply 100 ground may be explicitly coupled to the medium voltage power line 120 (in this embodiment through a resistor). The power supply 100 receives energy via the electrically non-conductive path 410 from a non-electrical energy source (not shown in FIG. 4) that may be remote from the medium voltage power line 120. Thus, the circuitry of the power coupling device 10, the signal processor 15, and any other circuitry on the medium voltage side of the data communication medium 30 (indicated by 800) are powered by the output voltage (Vout) of the power supply 100 and referenced to the ground of the power supply 100. For example, the output voltage (Vout) of the power supply 100 provides an input voltage (Vin) to the transmit circuitry 610 and receive circuitry 612. Likewise, the power supply 100, as well as the transmit circuitry 610 and the receive circuitry 612 may be ground referenced to the medium voltage power line 120. Thus, the components shown in FIG. 4 are electrically isolated from the low voltage power line via the electrically non-conductive path 410 and the data communication medium 630.

As discussed above, the power supply 100 ground also may be implicitly coupled to the medium voltage power line 120 in which case conductor 708 (including its resistor) would not be necessary. Instead, only a local ground that floats would exist. Leakage currents through the components processing the data signal such as transformer 720, capacitors 710, capacitors 606, transmit circuitry 610, and/or receive circuitry 612 may float the local ground substantially to the potential of the medium voltage power line 120. As a result, the grounds of the transducer 110 and voltage regulator 200 will also float to the same potential (since these local grounds are connected) so that the output 220 of the voltage regulator 200 (and transducer 120) will be relative to the potential of the medium voltage power line. In still other embodiments, the local ground may not float to the potential of the medium voltage power line and may remain isolated therefrom.

While the above embodiment employs a light source powered from the low voltage power line as the non-electrical energy source, other embodiments may use other sources. For example, another embodiment may use solar cell arrays to collect solar energy from the sun. In this alternate embodiment, the solar cell arrays, which act as the transducer, may be positioned on the outside of the power line coupling device and be electrically coupled to the voltage regulator positioned on the inside of the coupling device. Alternately, heat energy may be converted to electrical energy via a thermocoupler to provide energy to the power supply.

It will be understood to those skilled in the art that other components that are often incorporated as part of a power supply may be included in embodiments of the present invention, such as surge protectors and filters, which may be between the voltage regulator and transducer, on the output of the power supply, or between the ground reference 300 and the ground of the power supply 100. In addition, depending on the circuitry powered by the power supply and other factors, the voltage regulator may be omitted in some embodiments. Furthermore, some embodiments of the power supply may not supply a direct current, but may be a fluctuating power source (such as an alternating current (AC) source), which may be achieved, for example, through the addition of circuitry for converting a DC signal (e.g., from the output of the regulator or transducer) to an AC signal, which circuitry is well-known in the art.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A power supply providing an output voltage that is ground referenced to an object having a voltage potential relative to a first ground, comprising:
    a transducer having a transducer output and being configured to convert photonic energy to electrical energy;
    a voltage regulator having a regulator ground and regulator input, wherein said regulator input is electrically coupled to said transducer output to receive power therefrom and said regulator ground is electrically coupled to the object; and wherein
    said regulator includes a regulator output having voltage potential relative to the object.

2. The power supply of claim 1, wherein the first ground is earth ground.

3. The power supply of claim 2, wherein the object is a medium voltage power line.

4. The power supply of claim 1, further comprising:
    an electrically non-conductive medium in communication with said transducer;
    a photonic energy source in communication with said electrically non-conductive medium; and wherein
    said photonic energy source communicates energy to said transducer via said electrically non-conductive medium.

5. The power supply of claim 4, wherein said photonic energy source is powered by a power source with a first voltage potential relative to earth ground and the object is at a second voltage potential relative to earth ground.

6. The power supply of claim 5, wherein said first voltage potential is in the range of 100 volts to 250 volts relative to earth ground and said second voltage potential is in the range of 1000 volts to 100,000 volts relative to earth ground.

7. The power supply of claim 1, wherein said transducer includes a transducer ground electrically coupled to the object.

8. The power supply of claim 3, wherein said regulator output supplies power to circuitry for processing data signals communicated through the medium voltage power line.

9. The power supply of claim 8, wherein said regulator output supplies power to a fiber optic transceiver for communicating data signals.

10. The power supply of claim 8, wherein said circuitry forms part of a transformer bypass device.

11. The power supply of claim 8, wherein said circuitry forms part of a backhaul point.

12. The power supply of claim 1, wherein said transducer converts sunlight to electricity.

13. The power supply of claim 1, wherein said transducer receives photonic energy via a fiber optic conductor.

14. The power supply of claim 1, wherein said regulator ground is explicitly coupled to the object.

15. The power supply of claim 1, wherein said regulator ground is implicitly coupled to the object.

16. A power supply, comprising:
    a transducer having a transducer output and being configured to convert photonic energy to electrical energy;
    a voltage regulator having a regulator ground, regulator output, and regulator input, wherein said regulator input is electrically coupled to said transducer output to receive power therefrom; and wherein said regulator ground is electrically coupled to an energized power line conductor and said regulator output provides a voltage potential relative to the energized power line conductor.

17. The power supply of claim 16, wherein said regulator ground is explicitly coupled to the energized power line conductor.

18. The power supply of claim 16, wherein said regulator ground is implicitly coupled to the energized power line conductor.

19. The power supply of claim 16, further comprising:
an electrically non-conductive medium in communication with said transducer;
a photonic energy source in communication with said electrically non-conductive medium; and wherein
said photonic energy source communicates energy to said transducer via said electrically non-conductive medium.

20. The power supply of claim 19, wherein said photonic energy source receives power from a second power line.

21. The power supply of claim 16, wherein the first power line is a medium voltage power line.

22. The power supply of claim 21, wherein said regulator output supplies power to circuitry for processing data signals communicated through the medium voltage power line.

23. The power supply of claim 22, wherein said circuitry forms part of a transformer bypass device.

24. A method of providing a voltage potential that is relative to an object that has a voltage potential relative to a second ground, comprising:
communicating photonic energy to a transducer configured to convert photonic energy to electrical energy;
coupling the output of said transducer to the input of a voltage regulator to provide power to the regulator;
coupling the ground reference of said transducer and said regulator to the object; and
providing a voltage potential relative to the object at a regulator output.

25. The method of claim 24, wherein said second ground is earth ground.

26. The method of claim 25, wherein the object is a medium voltage power line and said coupling of the ground reference of said transducer and said regulator to the object is explicit.

27. The method of claim 24, further comprising:
providing an electrically non-conductive medium in communication with said transducer;
providing a photonic energy source in communication with said electrically non-conductive medium; and where said step of communicating comprises:
transmitting said photonic energy from said photonic energy source through said electrically non-conductive medium to said transducer.

28. The method of claim 27, wherein said energy photonic source is powered by a power source with a first voltage potential relative to earth ground and the object is at a second voltage potential relative to earth ground.

29. The method of claim 28, wherein said first voltage potential is in the range of 100 volts to 250 volts relative to earth ground and said second voltage potential is in the range of 1000 volts to 100,000 volts relative to earth ground.

30. The method of claim 26, further comprising the step of using power from said regulator to power circuitry for processing data signals communicated through the medium voltage power line.

31. The method of claim 30, wherein said circuitry forms part of a transformer bypass device.

32. A power supply providing an output voltage that is ground referenced to an object having a voltage potential relative to a first ground, comprising:
a transducer configured to convert photonic energy to electrical energy and having a transducer output and a transducer ground, wherein said transducer ground is electrically coupled to the object and said transducer output has a voltage potential relative to the object;
a voltage regulator having a regulator ground and regulator input, wherein said regulator input is electrically coupled to said transducer output to receive power therefrom and said regulator ground is electrically coupled to the object; and
said regulator includes a regulator output having voltage potential relative to the object.

33. The power supply of claim 32, wherein the object is a medium voltage power line.

34. The power supply of claim 32, further comprising:
an electrically non-conductive medium in communication with said transducer;
a photonic energy source in communication with said electrically non-conductive medium; and wherein
said photonic energy source communicates energy to said transducer via said electrically non-conductive medium.

35. The power supply of claim 34, wherein said photonic source is powered by a power source with a first voltage potential relative to earth ground and the object is at a second voltage potential relative to earth ground.

36. The power supply of claim 33, wherein said transducer output supplies power to circuitry for processing data signals communicated through the medium voltage power line.

37. The power supply of claim 36, wherein said circuitry forms part of a transformer bypass device.

38. The power supply of claim 33, wherein said transducer ground is explicitly coupled to the medium voltage power line.

* * * * *